3,732,198
POLYMERISATION OF ETHYLENE
Kenneth Stephenson Whiteley and Richard Roy Cooper, Welwyn Garden City, England, assignors to Imperial Chemical Industries Limited, London, England
No Drawing. Filed Jan. 19, 1970, Ser. No. 4,091
Claims priority, application Great Britain, Jan. 20, 1969, 3,136/69; Oct. 30, 1969, 5,324/69
Int. Cl. C08f 1/56, 1/58
U.S. Cl. 260—94.9 C       5 Claims

ABSTRACT OF THE DISCLOSURE

Ethylene is polymerised at pressures above 1,000 kg./cm.$^2$ using a catalyst comprising a compound of a transition metal and in the presence of from 0.5 to 20% (by weight on the ethylene monomer) of a compound containing a specified allylic group.

---

This invention relates to improvements in the polymerisation of ethylene.

It has been proposed in British Pat. 828,828 and in our copending British application Nos. 2,926/67, 10,464/67, 21,026/67, 57,910/67, 57,911/67 to carry out the polymerisation of ethylene at high pressures using catalysts comprising compounds of transition metals. This type of catalysis produces essentially linear polythenes having desirable stiffness and melt flow characteristics and equally important it increases the range of polythenes which can be made economically on conventional high pressure equipment.

Unfortunately, when compounds of transition metals are used in the catalysis of ethylene polymerisations at high pressure, the polymerisations are usually accompanied by a certain amount of free radical initiated polymerisation probably initiated by traces of oxygen or other free radical producing impurities present either in the ethylene monomer, in the catalyst or in diluent containing the catalyst. Polythene produced by such a free radical initiated polymerisation usually contains a high proportion of side branches on the polymer chain and the presence of this type of branched polythene tends to spoil the desirable properties of the more linear polythene produced by the complex transition metal catalyst. Further, since the competing reaction is probably due to impurities, the degree to which it occurs is extremely unpredictable and this is a serious disadvantage in operating continuous processes. It would be possible to retard the free radical polymerisation by the use of hydroquinone, quinone or similar well known free radical inhibitors, but these would cause problems both by attacking the transition metal compounds and by their continued presence in the polythene produced. For example, quinones colour the polythene, and many inhibitors are toxic.

According to this invention, we provide a process for the polymerisation of ethylene at pressures above 1000 kilograms per centimetre squared and at temperatures above 125° C. in the presence of a catalyst which comprises a compound of a transition metal and is capable of polymerising ethylene, wherein the polymerisation is carried out in the presence of from 0.5 to 20% (by weight based on the ethylene) of an "allylic compound" having the general formula

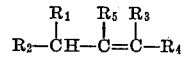

Where $R_1$, $R_2$, $R_4$, and $R_5$ are each chosen from the group consisting of hydrogen and hydrocarbon radicals and where $R_3$ is a hydrocarbon radical.

We also provide a process for the polymerisation of ethylene at pressures above 1000 kilograms per centimetre squared and at temperatures above 125° C. in the presence of a catalyst which comprises a compound of a transition metal and is capable of polymerising ethylene, wherein the polymerisation is carried out in the presence of from 0.5 to 20% (by weight based on the ethylene) of an "allylic compound" having the general formula

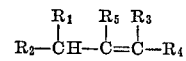

where $R_1$, $R_4$ and $R_5$ are each chosen from the group consisting of hydrogen and hydrocarbon radicals and $R_2$ and $R_3$ are hydrocarbon radicals.

The "allylic compound" may for example be but-2-ene but particularly useful are "allylic compounds" in which the double bonded carbon atoms form part of a six membered ring, especially for example, cyclohexene, methyl cyclohexenes, cyclohexa-1:4-diene and tetra hydronaphthalene (tetralin) or terpenes such as α-pinene. The most effective "allylic compounds" are those where $R_1$ is hydrogen.

It is preferred to carry out the polymerisation at pressures of 1,600 atmospheres and above to obtain a single phase in the reactor as the pressure is increased. It has been observed that as the pressure in the polymerisation reactor is increased, the tendency for unpredictable free radical polymerisations to occur also increases so that the presence of the "allylic compound" becomes increasingly important with increasing pressure. A similar increase in the unpredictable free radical polymerisation also occurs on increasing the temperature at which the polymerisation is carried out so that at temperatures of 200° C. or more the polythene produced in the absence of an "allylic compound" begins to show serious increases in swell ratio and stress exponent (as hereinafter defined).

Ziegler catalysts which comprise a combination of a compound of a transition metal of groups IVa to VIa of the periodic table with an organo-metallic compound of a metal of groups I to III of the periodic table are well known as catalysts which comprise a compound of a transition metal and are capable of polymerising ethylene at low pressures. They have been described in U.K. Pats. 799,323, 799,823 and 819,867 for example. A widely used Ziegler catalyst contains titanium compounds such as TiCl$_4$ or TiCl$_3$ in association with aluminium organo-compounds such as aluminium triethyl or aluminium diethyl chloride. Vanadium compounds such as VCl$_3$ or vanadium oxyhalides are also of interest but they are sufficiently toxic to restrict the applications of the resultant polymer. If TiCl$_3$ is to be used as a component of the Ziegler catalyst it may be obtained by one of several methods involving the reduction of $TiCl_4$. For example $TiCl_4$ may be reduced using hydrogen, or by use of aluminium alkyl compounds such as aluminium ethyl sequichloride. In another method, $TiCl_4$ is reduced by heating with aluminium to obtain a reduced titanium chloride which is associated with aluminium chloride in a composition thought to contain aluminium titanium and chlorine in the molar ratio 1:3:12. Such a composition and its preparation are described in U.K. Pat. 877,-050.

It is preferred to obtain the Ziegler catalyst as a fine dispersion in an inert hydrocarbon such as white spirit, pentane, hexane, heptane, iso-octane, toluene or a purified hydrocarbon fraction comprising a mixture of branched saturated aliphatic hydrocarbons having a boiling point in the range 170° to 190° C. and hereinafter referred to as "diluent A" for brevity. The dispersion is obtained by contacting the Ziegler catalyst in the diluent with an α-olefine containing at least five carbon atoms such as pentene-1, hexene-1, heptene-1, octene-1 or similar olefine within the range from hexene-1 to hexadecene-1. Normally we would choose the proportion of transition metal to α-olefine contained in the polymerization catalyst in a manner such that for each transition metal atom, 3 to 20α-olefine molecules are present. Preferably the polymerisation of the specified α-olefines is effected at temperatures of 60° C. and below, for example 50° C. and even room temperature. The catalyst thus obtained is dispersed in a finely divided, virtually colloidal form and substantially all the particles have a diameter not exceeding 5 microns and in many cases less than 1 micron. Other similar systems are described in our copending applications 51,471/68 and 53,064/68.

Other catalysts which comprise a compound of a transition metal include the so-called π-allyl complexes of transition metals such as zirconium in which a compound of the general formula

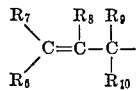

(where $R_6$, $R_7$, $R_8$, $R_9$, and $R_{10}$ are chosen from the group consisting of hydrogen atoms and alkyl groups) is bonded to the transition metal. The preparation of this type of compound is disclosed in U.K. Patent 1,028,408. Catalysts comprising the π-allyl complexes of transition metals may also be activated by organohalide compounds such as allyl bromide.

The amount of "allylic compound" added to the ethylene will depend on the amount of free radical polymerization which is likely to occur under the reaction conditions chosen and the nature of the free radical producing impurities present. For example oxygen induced polymerisation increases with temperature and pressure. Naturally all reasonable steps to reduce any impurities in the monomer, catalyst or catalyst dispersant should be taken. At temperatures of from 160–220° C. at pressures from 1600–2000 kg./cm.² we prefer to add the "allylic compound" in an amount which is from 1–10% per weight of the ethylene feed. The "allylic compound" may for example be added to the ethylene feed itself or else it can be added as the dispersant for the Ziegler catalyst.

It is believed that the "allylic compounds" used in this invention retard the free radical polymerization of ethylene and also reduce the molecular weight of the free radical polyethylene formed. The retardation of the polymerisation is believed to be due to the relatively stable nature of the free radical formed by hydrogen abstraction from the "allylic compound." The use of an "allylic compound" as described in this invention thus reduces the proportion of undesirable free radical polymer formed incidentally during high pressure polymerization employing a catalyst comprising a compound of a transition metal. The small amount of low molecular weight free radical polymer has little effect on the properties of the linear polyethylene produced.

One result of free radical induced polymerisation is to cause an increase in the spread of the molecular weight distribution of the polythene obtained and this increase occurs to varying and unpredictable extents and manifests as an increase in the swelling ratios and the stress exponents of the polythenes. The swelling ratio is defined as the ratio of the diameter of a solidified cylindrical extrudate to the diameter of the extrusion orifice. It is a measure of the melt elasticity of the polymer and is described by J. J. Benbow in the June 1963 issue of "Laboratory Practice."

The stress exponent is defined by the following ratio:

$$\text{Stress exponent} = \frac{\text{Log MFI}_5 - \text{Log MFI}_{2.16}}{\text{Log } 5 - \text{Log } 2.16}$$

$MFI_5$ and $MFI_{2.16}$ are the melt flow indices measured using weights of 5 kgms. and 2.16 kgms, respectively, at a temperature of 190° C.

The invention is illustrated by the following examples. In these examples the melt flow indices (MFI) quoted were measured according to British Standard 2782 Part 1/105c (i.e. A.S.T.M. test 1238–62T) using a 2.16 kg. weight at 190° C.

EXAMPLE 1

Ethylene containing about 2 molar percent of hydrogen as a chain transfer agent was polymerised in a high pressure polythene reactor of the stirred autoclave type using a Ziegler catalyst comprising $TiCl_3$ and an activator.

The $TiCl_3$ component of the catalyst was prepared by the reaction of $TiCl_4$ and aluminum ethyl sesquichloride in a purified hydrocarbon fraction comprising a mixture of branched saturated aliphatic hydrocarbons having a boiling point in the range 170–190° C. and hereinafter referred to as "diluent A." A solution of the sesquichloride in "diluent A" was added gradually drop by drop, with stirring, to a solution of $TiCl_4$ in the same diluent over a period of several hours, the temperature being held at 0° C. The molar ratio of total aluminum to titanium was approximately 1.6. The resulting slurry containing $TiCl_3$ was subsequently heated for a period at 95° C. The $TiCl_3$ was then washed several times with fresh quantities of the diluent.

The Ziegler catalyst itself was made up by taking a suspension of the $TiCl_3$ in "diluent A" and ading to it various quantities of an alkyl aluminium activator as specified in Table 1. The Ziegler catalyst was then used to polymerise either 16 moles of hexene-1, or 4 moles of decene-1 (as specified in Table 1) per mole of titanium at about 50° C. to give a finely dispersed catalyst which could be easily pumped using a diaphragm pump. The dispersed catalyst was then further diluted using a second diluent which was cyclohexene (or for purposes of comparison a paraffinic compound as specified in Table 1) and then pumped into the reactor. The operating conditions of the reactor together with the melt flow index, the swelling ratio and the stress exponent of the polythene produced are also shown in Table 1. Comparative experiments are denoted by Roman numerals. The "dwell time" is the average time elapsing between the entry of an ethylene molecule to the reactor and its subsequent departure therefrom either as a polymerised or as an unpolymerised molecule.

TABLE 1

| Experiment | Activator | Mole ratio of activator to TiCl₃ | Olefine used to disperse catalyst | Second diluent | Percent by weight of diluent second used based on total weight of ethylene passed | No. of moles of catalyst injected per 10⁶ moles of ethylene | Percent by weight of ethylene converted to polythene | Pressure, kg./cm.² | Temperature, °C. | Dwell time, sec. | M.F.I. | Swelling ratio | Stress exponent |
|---|---|---|---|---|---|---|---|---|---|---|---|---|---|
| 1 | Aluminium diethyl chloride. | 4 | Decene-1 | Cyclohexene. | 2.6 | 0.4 | 9.2 | 2,000 | 200 | 85 | 1.5 | 1.13 | 1.22 |
| I | do | 4 | do | Diluent A. | 1.8 | 1.7 | 9.0 | 2,000 | 200 | 70 | 1.8 | 1.18 | 1.31 |
| 2 | do | 2 | Hexene-1 | Cyclohexene. | 1.4 | 0.8 | 7.5 | 2,000 | 200 | 95 | 4.3 | 1.20 | 1.26 |
| II | do | 2 | do | Diluent A. | 1.1 | 3.1 | 13.9 | 2,000 | 200 | 70 | 5.2 | 1.24 | 1.34 |
| 3 | do | 2 | do | Cyclohexene. | 3.2 | 3.6 | 10.1 | 2,000 | 250 | 90 | 3.5 | 1.12 | 1.27 |
| III | do | 2 | do | Diluent A. | 1.0 | 4 | 12.4 | 2,000 | 220 | 80 | 5.7 | 1.32 | 1.49 |
| 4 | Aluminium tri-isobutyl. | 2 | do | Cyclohexene. | 3.7 | 1.3 | 9.8 | 1,600 | 200 | 80 | 2.2 | 1.18 | 1.26 |
| 5 | do | 4 | Decene-1 | do | 2.1 | 1.3 | 6.6 | 2,000 | 185 | 90 | 2.0 | 1.16 | 1.29 |

EXAMPLE 2

Ethylene containing about 2% molar of hydrogen as a chain transfer agent was polymerised in a high pressure polythene reactor of the stirred autoclave type using a Ziegler catalyst comprising TiCl₃ and an activator.

The TiCl₃ was obtained by reducing TiCl₄ vapour with hydrogen and is available as Stauffer HA titanium trichloride. The Ziegler catalyst was made up by adding aluminium triethyl to a suspension of TiCl₃ in "diluent A" in an amount such that the ratio of aluminium to titanium was 0.25 to 1. This mixture was then used to polymerise 6 moles of hexene-1 per mole of titanium at 50° C. The resultant slurry was then further diluted with cyclo-hexene (or for comparison "diluent A") and sufficient aluminium diethyl chloride was added to bring the aluminium to titanium ratio up to 3.25:1. This mixture was then pumped into the reactor and polymerisation was carried out under conditions as specified in Table 2 to give a polythene having properties recorded in Table 2.

600 mls. of a 0.75 molar solution of diisobutyl aluminium chloride in the same diluent was slowly added over a period of six hours. The mixture was stirred overnight and allowed to warm up to room temperature (15 to 20° C.). The temperature was then raised to 100° C., and this temperature was maintained for four hours. The catalyst was then washed repeatedly with cold diluent until the washings were substantially free from chloride as detected by aqueous silver nitrate.

The catalyst had the approximate formula:

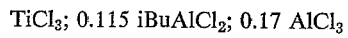

$$TiCl_3;\ 0.115\ iBuAlCl_2;\ 0.17\ AlCl_3$$

X-ray examination showed only the presence of the β-form of TiCl₃

This titanium trichloride material was then dispersed by slowly adding 19 mls. (about 10 mmoles) of decene-1 to a stirred suspension of 25 mmoles of the β-TiCl₃ in 225

TABLE 2

| Experiment | Second diluent | Percent by weight of second diluent used based on total weight of ethylene passed | Pressure in reactor, kg./cm.² | Temperature, ° C. | No. of moles of catalyst injected per 10⁶ moles of ethylene | Percent by weight of ethylene converted to polythene | Dwell, time, sec. | M.F.I. | Swelling ratio | Stress exponent |
|---|---|---|---|---|---|---|---|---|---|---|
| 6 | Cyclohexene | 2.1 | 2,000 | 200 | 5.0 | 8.9 | 95 | 0.8 | 1.10 | 1.15 |
| VI | Diluent A | 0.9 | 2,000 | 200 | 3.3 | 10.0 | 100 | 0.6 | 1.20 | 1.48 |

EXAMPLE 3

Ethylene containing about 2% molar of hydrogen as a chain transfer agent was polymerised in a high pressure polythene reactor of the stirred autoclave type using a Ziegler catalyst comprising a TiCl₃ component and an activator. The TiCl₃ component was made as follows:

Into a vacuum purged reaction vessel was introduced 55 mls. (500 mmoles) of titanium tetrachloride and 100 mls. of the same diluent as used in the catalyst preparation in Example 1–5. The solution was cooled to 0° C. and mls. of the hydrocarbon diluent at room temperature. After stirring for 18 hours, 23 mls. of a 25% by weight solution of diethyl aluminium chloride was added and the flask was stirred for a further six hours. No cooling was applied to the mixture during this treatment. The catalyst was obtained in the form of a fine dispersion. This fine dispersion was then diluted with a second diluent which was cyclohexene (or for comparison iso-octane) and then pumped into the reactor and polymerisation was carried out under conditions as set out in Table 3.

TABLE 3

| Experiment | Second diluent | Percent by weight of second diluent used based on total weight of ethylene passed | Pressure in reactor, kg./cm.² | Temperature, ° C. | No. of moles of catalyst injected per 10⁶ moles of ethylene | Percent by weight of ethylene converted to polythene | Dwell, time, sec. | M.F.I. | Swelling ratio | Stress exponent |
|---|---|---|---|---|---|---|---|---|---|---|
| 7 | Cyclohexane | 2.5 | 2,000 | 200 | 1.0 | 5.6 | 90 | 2.3 | 1.17 | 1.26 |
| VII | iso-Octane | 1.4 | 1,600 | 200 | 1.0 | 9.5 | 95 | 3.3 | 1.18 | 1.26 |

The example illustrates that despite an increase of 400 kg./cm.² in the polymerization pressure in experiment 7 over experiment VII, the swelling ratio and stress exponent obtained in experiment 7 were similar to those obtained in experiment VII.

EXAMPLE 4

Ethylene containing about 2% molar of hydrogen was polymerised in a high pressure reactor of the stirred autoclave type using Ziegler catalysts containing either $VCl_3$ or $VOCl_2$. The Ziegler catalysts were made by the procedure of example 1 except that $VCl_4$ or $VOCl_3$ were used instead of $TiCl_4$ and the activator chosen was exclusively aluminium diethyl chloride, the pre-treatment olefin was decene-1 and the second diluent was iso-octane. The polymerisation was carried out at 200° C. and a pressure of 2,000 kg./cm.². The other conditions and results are set out in Table 4.

TABLE 6

|  | Percentage of ethylene polymerised | Melt flow index | Swelling ratio | Density |
|---|---|---|---|---|
| Example: | | | | |
| 5 | 7.3 | 0.36 | 1.18 | 0.959 |
| 6 | 10.2 | 0.27 | 1.10 | 0.960 |
| 7 | 12.1 | 1.68 | 1.30 | 0.959 |
| 8 | 9.5 | 2.5 | 1.23 | 0.965 |
| 9 | 7.7 | 0.37 | 1.15 | 0.960 |
| 10 | 5.4 | 0.27 | 1.10 | 0.960 |
| 11 | 10.8 | 0.27 | 1.11 | 0.958 |
| 12 | 8.6 | 1.17 | 1.23 | 0.963 |
| Comparison: | | | | |
| A | 6.2 | 0.25 | 1.40 | 0.947 |
| B | 7.0 | 1.5 | 1.53 | 0.940 |
| Example: | | | | |
| 13 | 7.0 | 1.4 | 1.23 | 0.964 |
| 14 | 8.2 | 0.3 | 1.04 | 0.964 |
| Comparison: C | 6.9 | 0.5 | 1.33 | 0.934 |

TABLE 4

| Experiment | Transition metal component of catalyst | Molar ratio of $ALEt_2Cl$ to transition metal compound in catalyst | Second diluent | Percent by weight of second diluent used based on total weight of ethylene passed | No. of moles of catalyst injected per $10^6$ moles of ethylene | Dwell time, sec. | Percent ethylene converted to polythene | Swelling ratio | Stress exponent |
|---|---|---|---|---|---|---|---|---|---|
| 8 | $VCl_3$ | 4:1 | Cyclohexene | 3.3 | 1.8 | 85 | 6.3 | 1.27 | 1.16 |
| VIII | $VCl_3$ | 4:1 | iso-Octane | 3.4 | 4.5 | 95 | 9.5 | 1.36 | 1.48 |
| 9 | $VOCl_2$ | 3:1 | Cyclohexene | 1.8 | 4.7 | 95 | 11.2 | 1.22 | 1.18 |
| IX | $VOCl_2$ | 3:1 | iso-Octane | 5.4 | 1.3 | 100 | 6.0 | 1.28 | 1.66 |

EXAMPLES 5 TO 14

Ten polymerisations of ethylene numbered 5 to 14 together with three comparative polymerisations were carried under conditions as specified in Table 5. In Table 5 the column headed "Dispersant used" gives the total quantity of dispersant used in terms of a weight percentage based on the total weight of ethylene fed to the reactor. Similarly the column headed "Catalyst used" gives the total quantity of catalyst used in terms of a weight percentage based on the total weight of ethylene fed to the reactor. The columns headed ° C. and kg./cm.² give the temperatures and pressures at which the various polymerisations were carried out. The ethylene fed to the reaction vessel contained two mole percent of hydrogen to act as a molecular weight modifier. Catalyst was pumped into the reactor and comprised a solution of either tetrakis π-allyl or zirconium tetrakis π-methallyl dissolved in either cyclohexene or tetralin (or isooctane or heptane in the case of the comparative examples.) The solution also contained allyl bromide as a catalyst activator in various amounts as shown in Table 5 as a ratio of moles of allyl bromide to moles of catalyst present.

Table 6 lists the results obtained and includes the melt flow indices and swelling ratios of the various products obtained.

We claim:

1. A process for polymerizing ethylene which comprises contacting ethylene at pressures above 1000 kilograms per centimetre squared and at temperatures above 125° C. with a catalyst which is selected from the group consisting of (1) π-allyl complexes of transition metals of group IV-A to VI-A and (2) a Ziegler catalyst comprising an organoaluminum activator and a transition metal compound which is $TiCl_3$, $VCl_3$, or $VOCl_2$ dispersed in finely divided form in an inert hydrocarbon by contacting said compound with an α-olefin containing at least 5 carbon atoms, and in the presence of from 0.5 to 20% (by weight based on the ethylene) of an allylic compound which is selected from the group consisting of butene-2, cyclohexene, methyl cyclohexenes, cyclohexa-1:4-diene, tetrahydronaphthalene and α-pinene.

2. A process according to claim 1 wherein the allylic compound is selected from the group consisting of cyclohexene, methylcyclohexene, and tetrahydronaphthalene.

3. A process according to claim 1 wherein the allyl compound is α-pinene.

4. The process of claim 1, wherein the polymerization temperature is 160°–220° C., the pressure is 1600–2000 kg./cm.² and the allylic compound is used in an amount which is from 1–10% by weight of the ethylene feed.

TABLE 5

| Catalyst used | Ratio of catalyst to activator | Catalyst dispersant | Dispersant used | Catalyst used | ° C. | Kg./cm.² | Mean residence time in reactor in sec. |
|---|---|---|---|---|---|---|---|
| Example: | | | | | | | |
| 5 Zirconium tetra-π-allyl | 0.7 | Cyclohexene | 2.4 | 10.0 | 180 | 2,000 | 175 |
| 6 do | 1.2 | do | 1.8 | 6.7 | 180 | 2,000 | 120 |
| 7 do | 2.2 | do | 1.5 | 8.3 | 180 | 2,000 | 160 |
| 8 do | 2.2 | do | 5.8 | 16.1 | 180 | 2,000 | 170 |
| 9 do | 1.0 | do | 0.9 | 6.1 | 200 | 1,830 | 100 |
| 10 do | 1.0 | Tetralin | 1.7 | 5.4 | 180 | 2,000 | 120 |
| 11 do | 1.6 | do | 1.5 | 7.6 | 180 | 2,000 | 165 |
| 12 do | 2.0 | do | 3.1 | 5.7 | 180 | 2,000 | 145 |
| Comparison: | | | | | | | |
| A do | 1 | iso-Octane | 2 | 7.7 | 180 | 2,000 | 145 |
| B do | 1 | Heptane | 0.9 | 6.1 | 180 | 2,000 | 115 |
| Example: | | | | | | | |
| 13 Zirconium tetra-π-methallyl | 1 | Cyclohexene | 4.1 | 17 | 180 | 2,000 | 140 |
| 14 do | 1 | Tetralin | 7.7 | 37 | 180 | 2,170 | 140 |
| Comparison C do | 1 | iso-Octane | 0.8 | 5.6 | 180 | 2,000 | 130 |

5. The process of claim 1 wherein the allylic compound is selected from the group consisting of cyclohexene, methyl cyclohexenes, cyclohexa-1:4-diene and tetrahydronaphthalene.

References Cited

UNITED STATES PATENTS

| | | | |
|---|---|---|---|
| 2,879,263 | 3/1959 | Anderson et al. | 260—94.9 |
| 2,882,264 | 4/1959 | Barnes et al. | 260—94.9 |
| 3,127,387 | 3/1964 | Ham et al. | 260—94.9 |
| 3,274,167 | 9/1966 | Doak et al. | 260—94.9 |
| 3,347,840 | 10/1967 | Manyik et al. | 260—94.9 |
| 3,390,141 | 6/1968 | Richards | 260—88.2 |
| 3,454,538 | 7/1969 | Naarmann et al. | 260—94.9 |
| 3,058,963 | 10/1962 | Vandenberg | 260—88.2 |
| 3,379,706 | 4/1968 | Wilke | 260—94.9 |
| 2,933,480 | 4/1960 | Gresham et al. | 260—88.2 |
| 3,470,145 | 9/1969 | Lipman | 260—93.3 |
| 3,285,889 | 11/1966 | Arnold | 260—88.2 |
| 3,501,415 | 3/1970 | Herwig et al. | 260—94.9 |

FOREIGN PATENTS

| | | |
|---|---|---|
| 979,123 | 1/1965 | Great Britain. |
| 910,132 | 11/1962 | Great Britain. |
| 803,022 | 9/1968 | Netherlands. |

JOSEPH L. SCHOFER, Primary Examiner

E. J. SMITH, Assistant Examiner

U.S. Cl. X.R.

260—88.2 D, 88.2 E, 88.2 F, 94.9 E